March 30, 1954 H. F. MATARÉ ET AL 2,673,948

CRYSTAL DEVICE FOR CONTROLLING ELECTRIC CURRENTS BY MEANS OF A SOLID SEMICONDUCTOR

Filed Aug. 11, 1949

2 Sheets-Sheet 1

INVENTORS

HERBERT FRANÇOIS MATARÉ & HEINRICH WELKER

BY Theodore Hafner

ATTORNEY

March 30, 1954 H. F. MATARÉ ET AL 2,673,948

CRYSTAL DEVICE FOR CONTROLLING ELECTRIC CURRENTS BY MEANS OF A SOLID SEMICONDUCTOR

Filed Aug. 11, 1949

2 Sheets-Sheet 2

INVENTORS
HERBERT FRANÇOIS MATARÉ & HEINRICH WELKER
BY Theodore Hafner
ATTORNEY

Patented Mar. 30, 1954

2,673,948

UNITED STATES PATENT OFFICE 2,673,948

CRYSTAL DEVICE FOR CONTROLLING ELECTRIC CURRENTS BY MEANS OF A SOLID SEMICONDUCTOR

Herbert François Mataré and Heinrich Welker, Vaucresson, France, assignors to Societe Anonyme dite: Compagnie des Freins et Signaux Westinghouse, Paris, France Application August 11, 1949, Serial No. 109,752

Claims priority, application France August 13, 1948

3 Claims. (Cl. 317—235)

This invention relates to crystal devices for controlling electric currents by means of a solid semiconductor with the use of one or more control electrodes, either in a barrier layer of the semiconductor (see for example patent of addition No. 38,744 of July 5, 1930, to French Patent No. 649,432 of January 28, 1928, and French Patent No. 866,372 of October 5, 1942), or closely adjacent to semiconductive layers with a suitable insulator interposed therebetween (see French Patent No. 786,454 of March 1, 1935).

However, such systems were so difficult to apply on a commercial scale that they had to be abandoned or development had to be restricted to simple experimental models or laboratory samples. This experience is supported by publications such as: Nachrichten der Gesellschaft der Wissenschaften zu Göttingen, Yearly Report, by R. W. Pohl, 1933/34, page 55; Schweizer Archive, 1941, volumes 1 and 3: Ueber Sperrschichten, by W. Schottky; Zeitschrift fur Physik, vol. 111, volumes 5 and 6, 1938 (R. Hilsch and R. W. Pohl); Modern Theory of Solids, 1940 (F. Seitz); Crystal Rectifiers, 1948 (H. C. Torrey and C. A. Whitmer).

In order practically to carry into effect systems comprising solid semiconductors arranged to produce electronic relay effects similar to those occurring in electronic tubes, two essential difficulties must be overcome. Firstly, the diameter of the contact area between metal needle and crystal should be of an order proportional to the thickness of the crystal barrier layer. Secondly, the gap between the conductive electrodes where engagement occurs with the semiconductor should be so selected that one of the conductive electrode point members will be positioned inside the barrier layer area of the other point member.

With the thickest barrier layer made hitherto, it would have been necessary to use values lower than 5 $\mu$ both for the diameters of the contact areas, on the one hand, and for the gap between the pair of point members, on the other hand. Now if the first requirement could be met, provided that a needle is applied to a crystal with a pressure lower than 0.33 oz., for example, the second requirement causes considerable mechanical difficulties.

Various attempts have been made to find workable arrangements comprising three-electrode semiconductors of microscopic dimensions. However, in order to obtain an appreciable control action, it is necessary to select a crystal of such a low electronic or non-electronic concentration, or n-type excess and p-type deficiency concentration, respectively, that the inner resistivity of the device becomes very high. Arrangements of this type cannot be used practically for technical purposes.

The present invention permits to eliminate the above-mentioned difficulties and to realize on a commercial scale multi-electrode crystal devices of this kind for producing electronic relay action.

A more specific object of this invention is a multi-electrode device with at least two semiconductors of different conductivity characteristics; one of the semiconductors forms a control electrode and includes a surface barrier layer.

According to another feature of the invention, one of the semiconductors preferably the control electrode has a p-type (deficiency) or non-electronic conductivity and the other semiconductor an n-type (excess) or electronic conductivity.

According to a further feature of the invention, a semiconductor, preferably the other semiconductor mentioned above also includes a surface or internal barrier layer.

In one embodiment of the invention, the semiconductors or electrodes of the crystal are formed simultaneously from a single semiconductive element (such as germanium). In this element, by any suitable known method, zones of different conductivity characteristics are created.

Still in accordance with the invention, in at least one of said semiconductors or in one of the zones thereof such geometrical configuration is provided as to assure substantial radial distribution of the lines of force of the electric fields.

Furthermore, the invention relates to novel commercial products comprising multi-electrode crystal devices wherein external conductive electrodes are in direct contact with each semiconductive electrode, and wherein there is a gap between the contact points which is greater than 50 $\mu$.

Other features and advantages of this invention will appear from the specification in connection with the accompanying drawings, which illustrate preferred embodiments of the invention in a diagrammatical fashion and by way of example only.

Figure 1:
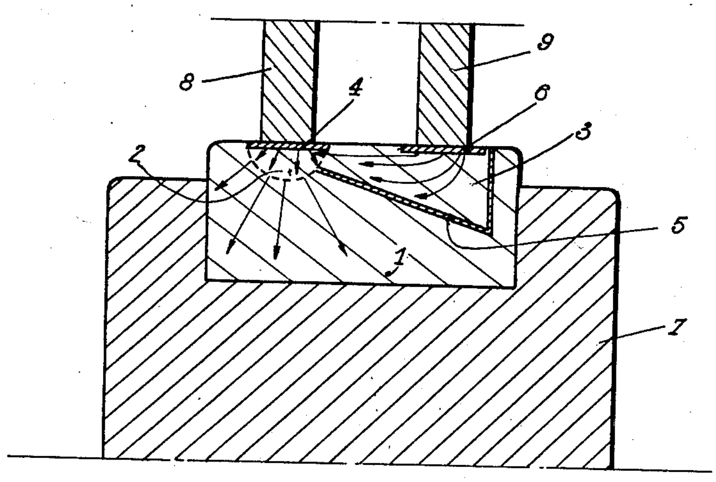
Fig. 1 represents a cross section of a one embodiment.
Figure 2:
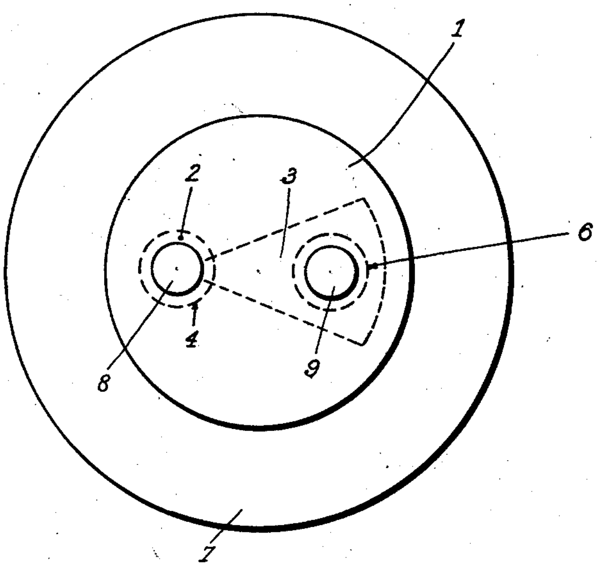
Fig. 2 is a corresponding plan view.

Referring to the drawings and more specifically to Figs. 1 and 2, the device illustrated is a multi-electrode crystal device constructed according to the invention. It comprises a semiconductive crystal 1 (for example of germanium) in which two zones 2 and 3 of different conductivity characteristics have been formed. For example, zone 2 has an n-type (excess) electronic conductivity and zone 3 a p-type (deficiency) electronic conductivity or vice-versa. Zone 2 has a surface barrier layer 4 and zone 3 an internal barrier layer 5, and also if desired a surface barrier layer 6. Furthermore, zone 2 is so formed that its geometrical structure will direct the lines of force of the electric fields radially.

The formation in crystal 1 of the zones of different conductivity characteristics and barrier layers is carried out for each specific zone by means of conventional and well-known methods such as melting, casting or crystallizing.

The semi-conductive crystal 1 is mounted in a metal support 7. Two needles 8 and 9 are applied respectively to zones 2 and 3; zone 3 operates as a control semiconductor and needle 9 as an external control electrode.

It is well understood that metal support 7 and needles 8 and 9 may be connected in any desired utilization circuit.

Figure 3:
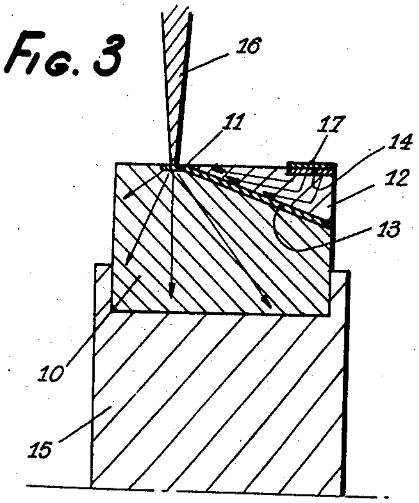
Figs. 3 to 6 represent cross-sections of other embodiments of the invention.

In the embodiment of Fig. 3, the multi-electrode crystal device includes a crystal 10, for example of germanium, provided in conventional manner with a surface barrier layer 11. Crystal 10 is also associated with a portion 12, for example of selenium. A barrier layer 13 is formed in the zone separating germanium 10 and selenium 12. A surface barrier layer 14 may, but need not, be provided on the selenium portion 12.

The combined germanium-selenium crystal 10, 12 is mounted on metal support 15 which forms an external electrode. Needle 16 is another external electrode and applied to the surface barrier layer 11 of germanium. An external control electrode 17 is applied to the selenium portion 17.

Figure 4:
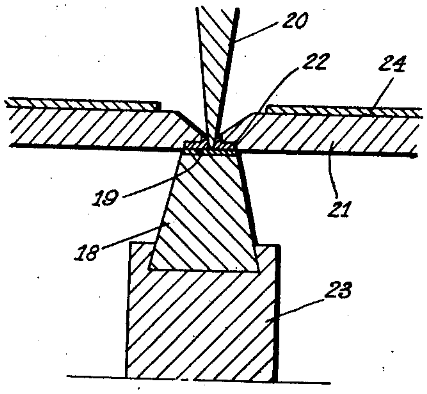

In the embodiment of Fig. 4, the multi-electrode crystal device according to the invention comprises a semi-conductive crystal 18, for example, of germanium, having a surface barrier layer 19 engaged by needle 20 which forms an external electrode. An element 21, for example of selenium, forms a semi-conductive control electrode. Selenium element 21 has formed thereon a barrier layer 22 arranged to surround completely the point of needle 20. Crystal 18 is mounted in metal support 23 forming an external electrode. There is a metal layer 24 on selenium element 21. Metal layer 24 forms an external control electrode and is applied by any suitable means such as spraying, melting, etc.

Figure 5:
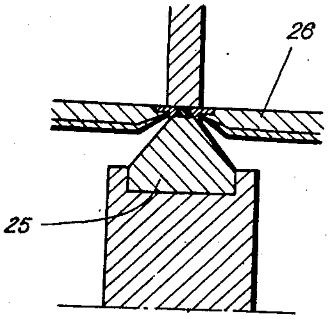

The embodiment of Fig. 5 resembles that of Fig. 4 except that semiconductive crystal 25 which is for example of germanium, has a cone-shaped point with an opening angle sufficiently obtuse to pass through control semiconductor 26, which is for example of selenium.

This arrangement has the advantage that the control field will act more directly upon crystal 25.

Figure 6:
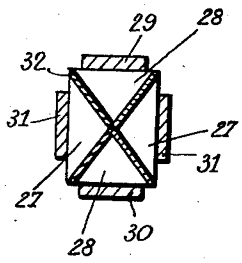

In the embodiment of Fig. 6, semi-conductive crystal 27, for example of selenium, encloses concentrically the needles or point crystals 28, for example, of germanium. The device is completed by external electrodes 29 and 30 contacting the germanium 28 and a ring-shaped external control electrode 31 surrounding selenium element 27, while barrier layers 32 are formed in the zone separating germanium 28 from selenium 27.

This arrangement has the advantage that the control field will act in all directions upon the germanium crystal.

It will be noted that in all the embodiments of Figs. 3 to 6 the germanium element may be replaced by any semiconductor of electronic type conductivity (such as silicon) and the selenium by any non-electronic type conductivity semiconductor (such as copper oxid).

In all these cases the control semiconductor should carry a barrier layer on its surface between the crystal semiconductor forming the other electrode and the needle or external electrode. In order to minimize the control losses it is preferable to select a semiconductor having a barrier layer the squared resistance value of which is very high in relation to the resistance of the crystal barrier layer.

What we claim is:

1. Multi-electrode crystal device for producing electronic relay action comprising a semi-conductor element having at least two zones of different conductivity characteristics, one of said zones being substantially of ring shape and the other zone comprising two substantially conically shaped portions extending axially from opposite directions along the axis and toward the center of the ring zone; said conical portions joining the ring zone in conical surfaces, said joining surfaces comprising at least one barrier layer, and said conical and ring shaped zones comprising individual metallic electrodes.

2. Device according to claim 1 wherein each of said conical portions has a separate electrode.

3. Device according to claim 1 wherein said conical portions meet with their tips at the center of the ring zone.

HERBERT FRANÇOIS MATARÉ.
HEINRICH WELKER.

References Cited in the file of this patent

UNITED STATES PATENTS

| Number | Name | Date |
|---|---|---|
| 837,616 | Dunwoody | Dec. 4, 1906 |
| 1,949,383 | Weber | Feb. 27, 1934 |
| 2,328,440 | Esseling et al | Aug. 31, 1943 |
| 2,476,323 | Rack | July 19, 1949 |
| 2,502,479 | Pearson | Apr. 4, 1950 |
| 2,524,035 | Bardeen | Oct. 3, 1950 |
| 2,538,593 | Rose | Jan. 16, 1951 |
| 2,552,052 | Matare | May 8, 1951 |
| 2,555,001 | Ohl | May 29, 1951 |
| 2,569,347 | Shockley | Sept. 25, 1951 |